(12) United States Patent
Vainer

(10) Patent No.: US 9,546,258 B2
(45) Date of Patent: Jan. 17, 2017

(54) UTILIZATION OF GASSES FOR POLYMERIC MATERIALS FRAGMENTATION AND ACTIVATION AND RELATED DEVICE

(71) Applicant: POLYMERIC POWDERS COMPANY PTY LTD, Armadale, VIC (AU)

(72) Inventor: Michael Vainer, Caulfield North (AU)

(73) Assignee: POLYMERIC POWDERS COMPANY PTY LTD, Keysborough, Vic (AU)

( * ) Notice: Subject to any disclaimer, the term of this patent is extended or adjusted under 35 U.S.C. 154(b) by 0 days.

(21) Appl. No.: 14/435,295

(22) PCT Filed: Jan. 21, 2013

(86) PCT No.: PCT/AU2013/000041
§ 371 (c)(1),
(2) Date: Apr. 13, 2015

(87) PCT Pub. No.: WO2014/110617
PCT Pub. Date: Jul. 24, 2014

(65) Prior Publication Data
US 2016/0145408 A1    May 26, 2016

(51) Int. Cl.
| | | |
|---|---|---|
| *C08J 11/16* | (2006.01) | |
| *C08J 11/04* | (2006.01) | |
| *B02C 17/16* | (2006.01) | |
| *B02C 17/18* | (2006.01) | |
| *B29B 17/04* | (2006.01) | |
| *B01J 8/08* | (2006.01) | |
| *B01J 8/10* | (2006.01) | |
| *C08J 3/12* | (2006.01) | |
| *B29K 21/00* | (2006.01) | |

(52) U.S. Cl.
CPC ............. *C08J 11/16* (2013.01); *B01J 8/082* (2013.01); *B01J 8/085* (2013.01); *B01J 8/10* (2013.01); *B02C 17/16* (2013.01); *B02C 17/1875* (2013.01); *B29B 17/04* (2013.01); *C08J 3/12* (2013.01); *C08J 11/04* (2013.01); *B01J 2208/00752* (2013.01); *B01J 2208/00867* (2013.01); *B29K 2021/00* (2013.01); *C08J 2300/30* (2013.01); *Y02P 20/143* (2015.11); *Y02W 30/625* (2015.05); *Y02W 30/70* (2015.05)

(58) Field of Classification Search
CPC .................................. B01J 8/082; B01J 8/85
USPC ............................................ 521/40; 422/229
See application file for complete search history.

(56) References Cited

U.S. PATENT DOCUMENTS

| | | | |
|---|---|---|---|
| 2008/0146685 A1* | 6/2008 | Yokoyama | C08G 63/78 521/48 |
| 2010/0102026 A1* | 4/2010 | Lee | C23C 16/0263 216/13 |
| 2012/0065280 A1 | 3/2012 | Vainer et al. | |
| 2014/0213681 A1* | 7/2014 | Bae | C08J 9/122 521/180 |

FOREIGN PATENT DOCUMENTS

| | | |
|---|---|---|
| EP | 0 042 588 | 12/1981 |
| EP | 2 011 563 A1 | 1/2009 |

OTHER PUBLICATIONS

International Search Report dated Mar. 18, 2013 from PCT/AU2013/000041, 3 pages.

* cited by examiner

*Primary Examiner* — Terressa Boykin
(74) *Attorney, Agent, or Firm* — Ohlandt, Greeley, Ruggiero and Perle, LLP

(57) ABSTRACT

The present invention relates generally to utilizing gasses for fragmenting polymeric materials and simultaneously modifying the surface area molecular structure of the said polymeric materials. More particularly, the present invention relates to a method and associated device for the processing of already preliminarily deformed polymeric materials, preferably without metal reinforcing elements, by utilizing aggressive gasses to both modify the polymeric materials surface area into an activated state and also simultaneously fragment the fed preliminarily deformed polymeric materials into a powder-like form with a relatively increased surface area.

19 Claims, 6 Drawing Sheets

UTILIZATION OF GASSES FOR POLYMERIC MATERIALS FRAGMENTATION AND ACTIVATION AND RELATED DEVICE

FIELD OF THE INVENTION

The present invention relates generally to utilising gasses for fragmenting polymeric materials and simultaneously modifying the surface area molecular structure of the said polymeric materials. More particularly, the present invention relates to a method and associated device for the processing of already preliminarily deformed polymeric materials, preferably without metal reinforcing elements, by utilising aggressive gasses to both modify the polymeric materials surface area into an activated state and also simultaneously fragment the fed preliminarily deformed polymeric materials into a powder-like form with a relatively increased surface area.

While it will be convenient to describe the present invention with reference to processing of end of useful life polymeric materials, such as end of useful life natural and synthetic rubber materials, chloroprene materials and the like, to provide a reclaimed product with advantageous properties that can again be reused in industrial applications, the invention is not limited to that application and may be used for value-add processing of non end-of-life polymeric materials for producing product with advantageous properties for industrial use.

The device of the present invention may be constructed as a fixed stationary device, or can be made mobile by being mounted on a land vehicle, rail carriage or sea going vessel.

Where used herein the term 'end of useful life' polymeric material is intended to be interpreted broadly, to refer to polymeric material that is no longer required for its originally intended use or that is created as excess, over-run or a by-product of an industrial process.

Where used herein the term 'aggressive gas' is intended to be interpreted broadly to refer to an agent that causes polymeric decomposition chosen from the group comprising ozone or ozone in combination with oxygen, halogens such as chlorine and fluorine, acids including super-acids such as HF, strong alkalis, oxidising agents and/or air, or combinations thereof and at any convenient temperature. The preferred embodiment of the present invention specifically makes reference to the term 'aggressive gas' with reference to ozone in combination with oxygen and nitrogen at room temperature of 20 degrees Celsius.

Where used herein the term 'preliminary deformation' is intended to be interpreted broadly, to refer to the prior compression and/or stretching, grinding and/or micronizing of the polymeric material to be processed. The polymeric material can be preliminarily deformed by, for example, applying bending, compressional, torsional or other force and/or cutting, shredding or pulverising it up into sections, segments or crumb.

Where used herein the term 'fragmentation' refers to producing particulate material, the resultant fragments typically ranging in size from a few millimeters down to quite small particles, powders and dust.

BACKGROUND OF THE INVENTION

The discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventors knowledge and experience and, accordingly, any such discussion should not be taken as an admission that any of the material forms part of the prior art base or the common general knowledge in the relevant art in Australia, or elsewhere.

End of Useful Life Polymeric Materials

Polymeric wastes, such as for example used rubber tyres, used rubber conveyor belts, and used chloroprene products such as wet suits or the like, have become a global economic and environmental problem.

Polymeric waste materials comprise a wide range of polymers including natural rubber co-polymers and synthetic rubbers such as SBR (styrene butadiene rubber) and butadiene rubber, nitride rubber, isoprene rubber, chloroprene rubber and polysulphide rubber.

The present invention addresses the economic and environmental issues associated with the disposal of such polymeric waste materials by presenting a novel reprocessing solution for polymeric materials reuse, as well as being an innovative value-add process for any polymeric materials in its own right by modifying non end-of-life polymeric materials for advantageous industrial use.

Advantages of Activation

Advantages of activated polymeric materials, such as for example surface activated rubber crumb from end of useful life tyres, are well known as demonstrated for example at the joint seminar held at Finland's Tampere University of Technology by Kumi-instituutti & MOL (October 2009), where it was shown that the influence on compound properties by surface activated rubber crumb as opposed to untreated rubber crumb provided improved properties such as an increase in the tensile strength of the resultant compounded materials. The results are shown in FIGS. 5A and 5b.

Activation of materials can occur via known methods such as for example: irradiating energised ion particles onto the surfaces of the polymer while blowing a reactive gas directly over the surface of the polymer as described in for example U.S. Pat. No. 6,300,641; electron beam produced plasma technologies as described in for example patent application WO 2005/100629; organocatalytic acid based technologies as described in for example patent application PCT/CA2008/001554; and utilisation of chemical reagents as described in for example patent application PCT/US2010/061133 or metal ions combined with peroxide as described in for example patent application WO 2005/028744.

The present invention alternatively provides a method and device for gaseous activation that is simpler and less expensive than the methods of activation referred to above, and is specifically designed for more effective and efficient simultaneous fragmentation and surface area activation of already preliminarily deformed polymeric materials, the said polymeric materials being preferably without metal reinforcing elements.

PRIOR ART

The closest prior art methods and/or devices to the present invention include the following:
- PCT/RU95/00048, which requires a high energy consuming deformation process inside the ozone containing reaction chamber, as well as temperatures of up to 110° C. which degrades the ozone gas.
- U.S. Pat. No. 6,579,950, which also requires a rubber waste deformation unit inside the casing to subject rubber waste to high energy consuming deformation together with ozone-containing gas.

WO 2005/035115, which requires a catalyst with a catalyst additive, as well as being only specific to propylene.

WO 2007/061280, which requires an additional chemical pre-treatment step and a further additional expensive cryogenic cooling step prior to disintegrating the polymeric waste.

WO 2010/132918, which requires the higher energy consuming steps of separating polymers from their associated fibre and metal reinforcing elements, as well as the requirement of subjecting the products through a riddle disposed within the reaction chamber.

Importantly, no prior arts specifically activate the surface area of the already preliminarily deformed polymeric materials placed inside the vessel of the present invention utilising the specific formulation and concentrations of aggressive gasses as per the present invention together with its associated safety features, whilst also simultaneously reducing the polymeric materials particle size relative to its resultant surface area as per the energy efficient mechanical agitation process of the present invention, in order to provide the resultant activated polymeric powder-like particles with more advantageous characteristics for utilisation as ingredients in industry, such as for example the rubber products manufacturing industry and the polymeric composites products manufacturing industry.

It is therefore desirable to provide an alternative method and device for processing polymeric materials that overcomes some or all of the drawbacks of the methods or devices of the prior art.

SUMMARY OF THE INVENTION

The main objective of the present invention is to a relatively less energy intensive and less expensive yet more efficient and effective polymeric materials fragmentation and activation method and associated device that can provide a reprocessing solution for polymeric materials reuse compared to current polymer recycling processes, as well as provide a means for fragmenting and activating non end-of-life polymeric materials for producing product with value-added properties of activated surface area together with a simultaneous reduction of the polymeric materials particle size relative to its resultant surface area for advantageous industrial usage.

A further objective of the present invention is to alleviate at least one disadvantage associated with the related prior art.

Utilisation of Aggressive Gasses

Aggressive gas is to be applied into the internal chamber of the vessel of the present invention, where in the preferred embodiment the said vessel's contact area with the aggressive gas is to be preferably constructed of SUS316L stainless steel. The application of the said aggressive gas can be by any convenient means for the purpose of breaking chemical bonds and modifying the surface area of the preliminarily deformed polymeric material placed within the said vessel thereby causing the surface area of the said polymeric material to turn into an activated state whilst simultaneously downsizing the said polymeric material by resultant fragmentation also caused by the action of the aggressive gas in conjunction with the agitation system inside the said vessel of the present invention. The aggressive gas may be applied neat, or in diluted form such as a mixture of gases, with or without a catalyst.

Typically, the system for admission and control of aggressive gasses comprises feed lines, inlet and outlet ports with associated pipe sockets communicating with the reaction vessel or casing; valves, pumps and other mechanical devices readily apparent to the person skilled in the art, including the incorporation of gas compressors and gas compressor systems. The system may be under manual control, electronic control or a combination of the two.

Typically, the system further includes a pump for forcing a flow or suction of air, or applying a partial or full vacuum to the reaction vessel. The air flow or vacuum can assist in emptying out any unwanted particulate matter.

Many polymers, especially step-growth polymers, can be modified by such an aggressive gas application. Synthetic polymers are typically made by condensation polymerization, so the caused modification to create the required alteration of the polymeric material is a reversal of this synthetic reaction.

Further, to those versed in the art, it is evident that aggressive gasses also typically cause the breakdown of polymers by breaking their chemical bonds, thus rupturing the carbon chains and reducing the polymer to fragments. For example as little as 3 to 5 ppm of ozone will react in a thin surface layer ($5 \times 10^{-7}$ m) of natural rubber. Rupture of the carbon chains by ozone is increased in the presence of active hydrogen. In addition, cross linking and side branch formations occur and make rubber polymeric material more brittle as well as more prone to forming cracks, particularly in areas of high stress.

In some polymers such as polyvinyl chloride (PVC) breakdown can also occur as a result of the formation, and then rupture of double bonds. For example the active hydrogen in acids removes the chloride from the carbon-chlorine bond in PVC forming hydrochloric acid (HCl). The HCl produced may then cause dechlorination of adjacent carbon atoms. The dechlorinated carbon atoms then tend to form double bonds, which can be attacked and broken by ozone, just like the alteration of natural rubber polymeric material described above.

Irrespective of the method by which the aggressive gas is admitted, the appropriate concentration of an aggressive gas must be applied to the preliminarily deformed polymeric material for the amount of time necessary to cause decomposition of the one or more polymers. Further, the temperature effect on an aggressive gas such as ozone must be taken into consideration, noting that increased temperatures cause the ozone gas to become less effective and therefore less beneficial in its action of fragmenting polymeric materials, whilst also combined with the consideration of ozone concentration and the related working temperature is required for estimation of degradation of rubber, as demonstrated by such researchers as Tanaka and Koike (*Simultaneous effects of ozone concentration and temperature on ozone degradation of rubber sheets*—Institute of Technology, Tokyo, Japan 1991).

The concentration of the aggressive gas required to break chemical bonds varies from polymer to polymer. For example a higher concentration of aggressive gas is required to break the chemical bonds of hard, inelastic polymers, than the softer elastic types of polymeric materials. However, although prolonged exposure to a high concentration of aggressive gas will break bonds in hard polymer, the softer, more elastic polymers can become over-exposed and unnecessarily degraded.

Preferably therefore, the method of the present invention utilises batch processing of groups of polymeric materials whereby the hardness and elasticity of the batch of the preliminarily deformed polymeric material is matched to an appropriate reaction time and concentration of aggressive gas together with the related working temperature.

Further, the method of the present invention also preferably separates out preliminarily deformed polymeric materials that have previously been treated for ozone resistance with even the most effective chemical anti-ozonants, such as for example N'N-dioctyl-p-phenylenediamines at 15 parts per 100 parts of resin for polymeric products such as for example ozone-resistant tyres, prior to separate batch processing of the said polymeric materials hard and soft polymers, such as for example separate batch processing of tyre tread and tyre sidewall materials respectively.

These said polymeric materials previously treated for ozone resistance require relatively more prolonged exposure to a higher concentration of aggressive gas, yet the method and device of the present invention still cause the effect of the anti-ozonants to be completely suppressed at an ozone concentration ≤10 percent of the total percentage of the gaseous working environment within the vessel of the present invention by weight.

The utilisation of ozone required by the present invention for sufficient fragmentation of the preliminarily deformed polymeric material is a maximum of 4 grams of ozone per 1 kilogram of said polymeric material, with a minimal ozone flow rate of 1 liter per minute of ozone for every 10 liters of vessel volume of the present invention.

For optimal control, the aggressive gas ozone can readily be converted to oxygen by application of heat or chemical reaction with or without a catalyst.

Mechanical Agitation

The present invention includes the application of low energy intensive light mechanical agitation to the already preliminarily deformed polymeric material placed inside the vessel of the present invention prior to, during, and/or after the aggressive gas is applied into the vessel of the present invention to optimise the fragmentation of the said preliminarily deformed polymeric material, without the need for application of great force, and without adding to the complexity of the method or device.

The amount of mechanical agitation required in the vessel of the present invention is allowed to vary depending on the nature of the batched preliminarily deformed polymeric material. For example, soft elastic polymer will not require as much agitation as hard inelastic polymer.

The vessel of the present invention will therefore necessarily incorporate mechanical agitation means to optimise simultaneously reducing the relative particle size of the preliminarily deformed polymeric material in relation to their resultant surface area. The said mechanical agitation promotes further fragmentation as the applied aggressive gas modifies the surface area of the said polymeric material into an activated state whilst simultaneously propagating the cracks with aggressive gas within the preliminarily deformed polymeric materials. As propagation of these cracks increases, new surfaces are opened for degradation to occur, and the original preliminarily deformed polymer material is further reduced to fragments in order to produce a powder-like particulate form with the requisite activated surface area.

Further, the action of the said mechanical agitation limits the diffusion of aggressive gas and particularly ozone gas to the surface of the said polymeric materials by circulating the aggressive gas near the surface of the polymeric materials, thus increasing convection and providing a faster kinetic disintegration of the said polymeric materials.

The preferable geometric shape of the vessel of the device of the present invention is of a conical-cylindrical geometry.

The optimal mechanical agitation means to be incorporated with the preferred conical-cylindrical device of the present invention are mixing paddles with helical blades situated inside the vessel of the device out of a principal axis screw which is itself surrounded by a central spire, driving the said polymer material from up to down and around the said vessel. The mixing paddles connected to the screw in the central axis of the vessel are preferably constructed as a spiral distributed cone-like shape joined closely with the internal conical-cylindrical surface of the vessel to also lift the said polymer material from bottom to top for optimal processing, the said mixing paddles being preferably of SUS316L stainless steel material. This utilises the mechanics understood with the principle of conical mixers.

For illustration purposes of the present invention, the most efficient preferred embodiment of the present invention incorporates mixing paddles with helical blades situated inside the vessel of the device out of a principal axis, which is itself surrounded by a central spire, the said elements being controlled by a variable speed drive motor with a speed range of 10 to 50 revolutions per minute (RPM) at a frequency of 50 Hertz (Hz).

However, other similar mechanical agitation means specifically adapted for the method of the present invention readily apparent to the person skilled in the art may alternatively be situated inside the vessel of the device, such as a for example a conical screw convective mixer, a hollow rotational mixing drum, a ribbon mixer or the like.

The preferred embodiment also utilises a pneumatic ball valve for emptying the device of the present invention either during or after the mechanical agitation.

Gaseous Surface Activation Process

The methodology of the present invention has made utilisation of the mechanism of catalysed gaseous reactions described by Yang, K. H. and Hougen, O. A. (Chemical Engineering Progress, 1950, Vol. 46 (3), pp. 146-157), as well as employing the general structural model developed for the description of non-catalytic gas-solid reactions by Sohn, H. Y. and Szekely, J. (Chemical Engineering Science, 1972, Vol. 27, pp. 763-778) who demonstrated the irreversible reaction between a porous solid and a reactant gas for spherical and flat plate like pellets, made up of spherical or flat plate-like grains. Further, the methodology of the present invention has also made utilisation of the surface activation protocol put forward by Yunchao Li, Zhen Wang, Lily M. L. Ou, and Hua-Zhong Yu (Analytical Chemistry, 2007, Vol. 79 (2), pp. 426-433), who demonstrated that ozone treatment of polycarbonate produces a hydrophilic surface with a high density of reactive carboxylic acid groups [(4.8±0.2)×10−10 mol/cm2] in less than 10 minutes at ambient conditions, with no significant aging or physical damage to the substrate being observed.

The present invention has thus further advanced current knowledge for developing a gaseous surface activation process utilising gas-solid reactions with specific exploitation of ozone preferably in combination with oxygen and nitrogen at 20 degrees Celsius room temperature conditions in order to achieve specific levels of requisite molecular functional groups at the surface area of the processed batches of preliminarily deformed polymeric materials ranging from hard inelastic to soft elastic polymeric materials. Treatment by the present invention of the said preliminarily deformed polymeric materials which typically contain carbon has also expanded on the current knowledge of activated carbon methodologies for application in effective and efficient polymeric materials surface area modification, whereby traditionally, active carbons are made in particular form as powders or fine granules less than 1.0 millimeters in size with an average diameter between 0.15 and 0.25 millimeters.

Thus, it has been demonstrated that a large surface to volume ratio can be presented with a small diffusion distance, where granular activated carbon is defined as the activated carbon being retained on a 50-mesh sieve (0.297 mm), and powdered activated carbon is defined as finer material corresponding to an 80-mesh sieve (0.177 mm) and smaller. The industrial usefulness learnt from activated carbon is that it binds materials by van der Waals force or London dispersion force. However, powdered activated carbon is not commonly used in a dedicated vessel, owing to the high head loss that would occur.

The present invention enables activation of the surface area of the processed preliminarily deformed polymeric materials via efficient and cost effective means, with simultaneous fragmentation of the said preliminarily deformed polymeric materials by breaking the chemical bonds and particularly the covalent bonds of the polymers resulting in simultaneously reducing the polymeric materials relative particle size to its resultant surface area, utilising aggressive gaseous means where an environment is created within a vessel with ozone concentrations of 10% by weight or less as required, depending on the batch of preliminarily deformed polymeric materials being processed. Batches are determined in range from hard inelastic polymers to soft elastic polymers, where a higher concentration of ozone is required to break the chemical bonds of hard, inelastic polymers, than the softer elastic types of polymeric materials.

The optimum gaseous concentration percentage by weight inside the atmosphere of the vessel of the present invention is in a ratio of A %:B %:C %, where A<B<C and A≤10% of the total % by weight, A=Ozone
B=Nitrogen
C=Oxygen The required molecular functional groups increased on the surface area of the processed polymeric materials by the gaseous surface activation process include the following:

Aldehyde, with the structure R—CHO, consists of a carbonyl centre (a carbon double bonded to oxygen) bonded to hydrogen and an R group, which is any generic alkyl or side chain.

Carboxylic acid, with the structure R—COOH, where R is some monovalent functional group, characterized by the presence of at least one carboxyl group.

Hydrogen peroxide, with the structure (H2O2) which is the simplest peroxide (a compound with an oxygen-oxygen single bond).

Hydroxyl, with the structure R—OH, where R represents a hydrocarbon or other organic moiety bonded with an oxygen atom being connected by a covalent bond to a hydrogen atom.

Ketone, with the structure RC(=O)R', where R and R' can be a variety of carbon-containing substituents. It features a carbonyl group (C=O) bonded to two other carbon atoms.

These functional groups are depicted in the Fourier transform infrared spectroscopy (FTIR) analysis graph from preliminary studies shown in FIG. 6, where the black and grey lines respectively represent the presence of the above noted molecular functional groups before and after the above outlined gaseous surface activation process.

Activation of the surface area of the preliminarily deformed polymeric materials is noted to occur at a faster rate when the said polymeric materials contain carbon black within their makeup.

Safety Features

The presence of fine polymeric material fragments in suspension in a high oxygen/ozone atmosphere do give the potential for extremely high and damaging explosion, pressures to be developed. Therefore explosion vent protection is necessary if an appreciable amount of fine material is present, as an explosion in the vessel is capable of causing severe damage to apparatus and persons in the area.

Thus, the preferred embodiment of the present invention incorporates an explosion vent for the vessel to suit Maximum Explosion Pressure Pmax=12.8 bar and Maximum Rate of Pressure Rise Kst=149 m·bar/s.

In addition, the preferred embodiment of the present invention incorporates electric protection class for the drive assembly of the vessel.

BRIEF DESCRIPTION OF THE DRAWINGS

The present invention will now be described with reference to the figures of the accompanying drawings, which illustrate a particular preferred embodiment of the present invention, wherein.

DETAILED DESCRIPTION OF THE PREFERRED EMBODIMENT

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

Figure 1:
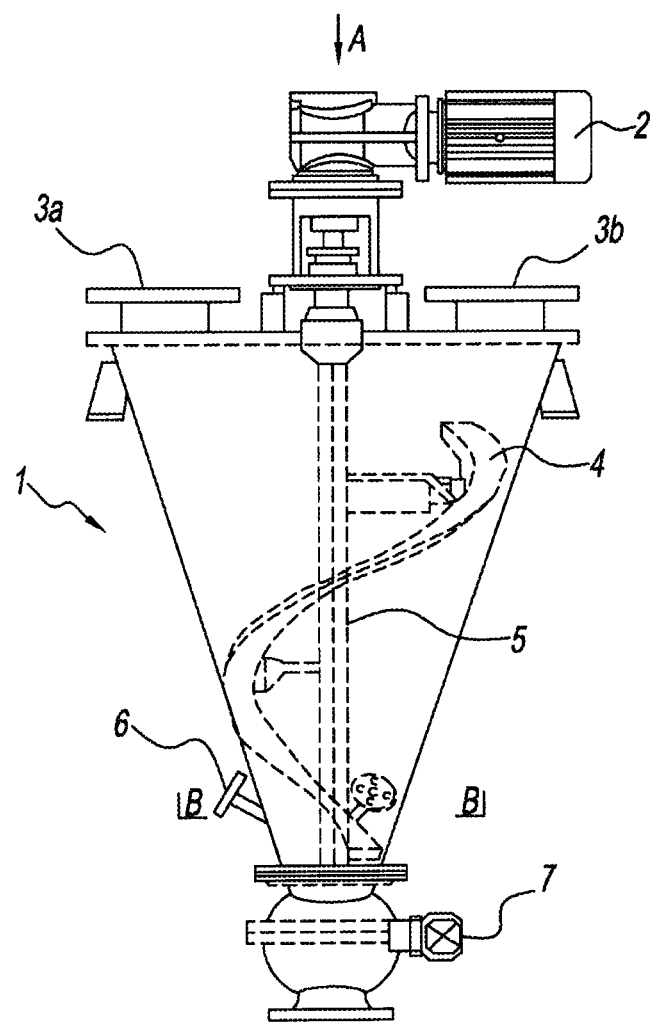
FIG. 1 is a cross-sectional side view of the device of the present invention, in particular depicting the mixing paddles with helical blades situated inside the vessel of the device out of a principal axis.

The preferred embodiment of the present invention of a polymer fragmentation and activation method and device is presented together with depictions of the fragmentation and activation vessel 1 preferably constructed of SUS316L stainless steel, the said vessel 1 being illustrated in FIG. 1 utilising a motor 2, with preferably a variable speed drive, for enabling controlled mechanical agitation of the already preliminarily deformed polymeric materials and the aggressive gas inside the vessel 1 for the purpose of causing the breakdown of the said polymeric materials by the said aggressive gas breaking their chemical bonds, thus rupturing the polymer carbon chains and reducing the polymer materials to fragments, and simultaneously modifying the surface area of the said polymeric materials placed within the said vessel 1 thereby causing the surface area to turn into an activated state with an increase in the requisite Aldehyde, Carboxylic acid, Hydrogen peroxide, Hydroxyl, and Ketone molecular functional groups.

The already preliminarily deformed polymeric materials, preferably of a size of 5 millimeters or smaller and without metal reinforcing elements, are fed into the vessel 1 through feeding ports 3a, 3b. Processing of the said polymeric materials preferably utilises separate batch processing of groups determined by the different hardness and elasticity of the batch, each batch being accordingly matched to an appropriate reaction time and concentration of aggressive gas at 20° C. room temperature. Preferably, the said processing initially separates out any polymeric materials that have previously been treated for ozone resistance prior to their own separate batch processing according to the hardness or softness of the polymeric materials treated for ozone resistance.

The batches of harder polymeric materials undergo a relatively more prolonged exposure to a relatively higher concentration of aggressive gas than required for the softer polymeric materials, and the polymeric materials previously treated for ozone resistance undergo a relatively even more prolonged exposure to a relatively even higher concentration of aggressive gas. Yet regardless of which of the said batches are being processed, the method and device of the present invention still causes the desired fragmentation and surface activation effect at an ozone concentration of ≤10 percent of the total percentage of the gaseous working environment within the vessel 1 of the present invention by weight.

The aggressive gas formulation utilised by the present invention for the said fragmentation and activation of the already preliminarily deformed polymeric material without metal reinforcing elements is a ratio of gasses:

$$A\%:B\%:C\%, \text{ where } A<B<C \text{ and } A \leq 10\% \text{ of the total \% by weight,} \quad [1]$$

A=Ozone, B=Nitrogen, C=Oxygen

The specific utilisation of ozone required by the present invention for the said sufficient fragmentation and activation of the already preliminarily deformed polymeric material is a maximum consumption of 4 grams of ozone per 1 kilogram of said polymeric material by weight, with a minimal ozone flow rate of 1 liter per minute of ozone for every 10 liters of vessel volume at standard atmospheric pressure and room temperature of 20° C.

Figure 3:
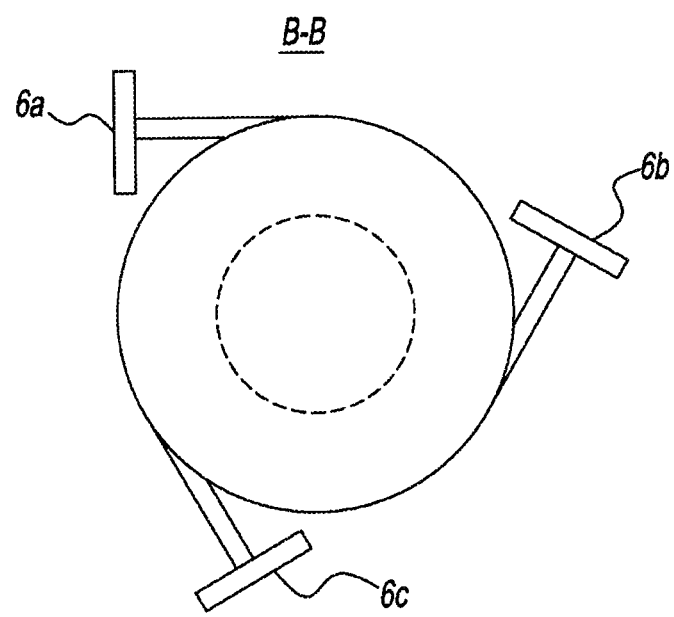
FIG. 3 is a cross-sectional top-down view of the device of the present invention through axis B-B, in particular depicting the distal gas inlets of the device of the present invention.

The aggressive gas is fed into the vessel 1 through gas inlets 6, the preferred arrangements of the said gas inlets 6 being illustrated in FIG. 3 as gas inlets 6a, 6b and 6c towards the bottom of the vessel 1. Typically, the system for admission and control of the aggressive gas comprises feed lines, inlet and outlet ports with associated pipe sockets communicating with the reaction vessel or casing, valves, pumps and other mechanical devices readily apparent to the person skilled in the art, including the incorporation of gas compressors and gas compressor systems. The aggressive gas may be applied neat, or in diluted form such as a mixture of gases or in a solution.

The system may be under manual control, electronic control or a combination of the two. The system further typically includes a pump for forcing a flow or suction of air, or applying a partial or full vacuum to the reaction vessel. The air flow or vacuum can assist in emptying out any unwanted particulate matter.

Mechanical agitation occurs by the means of the motor 2 enabling the mixing paddles 4 connected to a screw 5 in the central axis A to stir the aggressive gas and the fed polymeric materials. This mechanical agitation limits the diffusion of the aggressive gas to the surface of the fed polymeric materials by circulating the aggressive gas near the surface of the polymeric materials, thus increasing convection and providing a faster kinetic disintegration of the said polymeric materials. The said mechanical agitation also promotes further fragmentation of the fed polymeric materials as the applied aggressive gas enters the cracks in the already preliminarily deformed polymeric materials and propagates the said cracks. As propagation of these cracks increases, new surfaces are opened for degradation to occur, and the original preliminarily deformed polymer material is further reduced to fragments.

Figure 2:
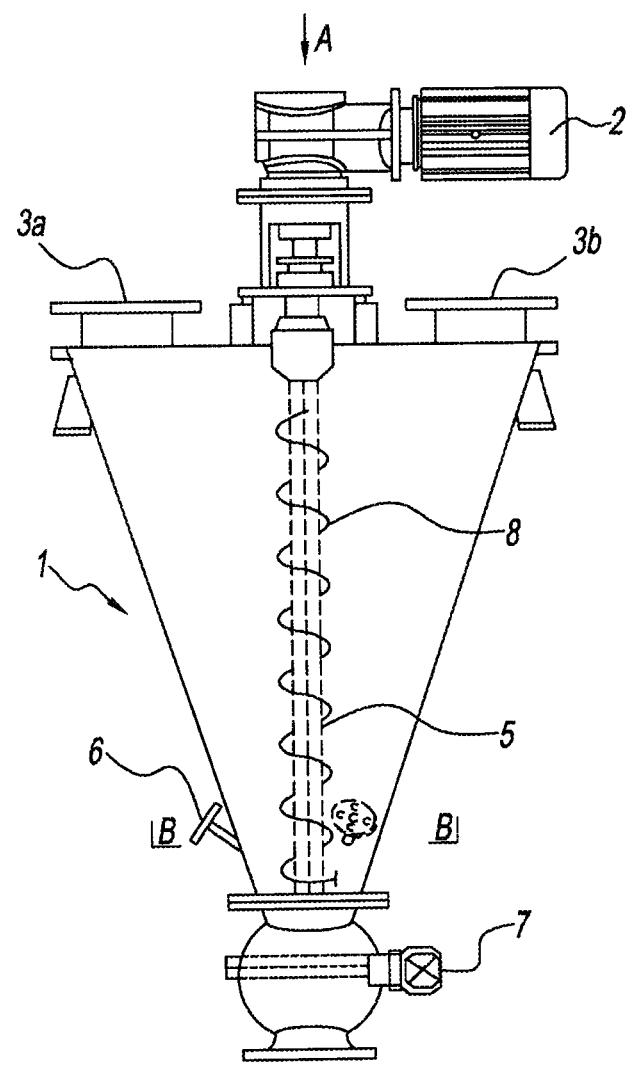
FIG. 2 is a cross-sectional side view of the device of the present invention, in particular depicting the principal axis situated inside the vessel of the device surrounded by a central spire.

Additionally, the screw 5 at the principal central axis A is itself surrounded by a central spire 8 as depicted in FIG. 2 for driving the said polymer material from up to down and around via its spiral distributed cone-like shape, joined closely with the internal conical-cylindrical surface of the vessel 1 to also lift the said polymer material from bottom to top for optimal processing. The said fragmentation and activation reactions in vessel 1 are therefore achieved simultaneously by the aggressive gas breaking chemical bonds when acting in conjunction with the mechanical agitation by the mixing paddles 4 connected to a screw 5 in the principal central axis A of the vessel 1, the said principal axis itself also being surrounded by a central spire 8.

The vessel 1 preferably utilises a pneumatic ball valve 7 for emptying the device of the present invention either during or after the mechanical agitation. For optimal control, the aggressive gas ozone can readily be converted to oxygen by application of heat or chemical reaction with or without a catalyst.

Figure 4:
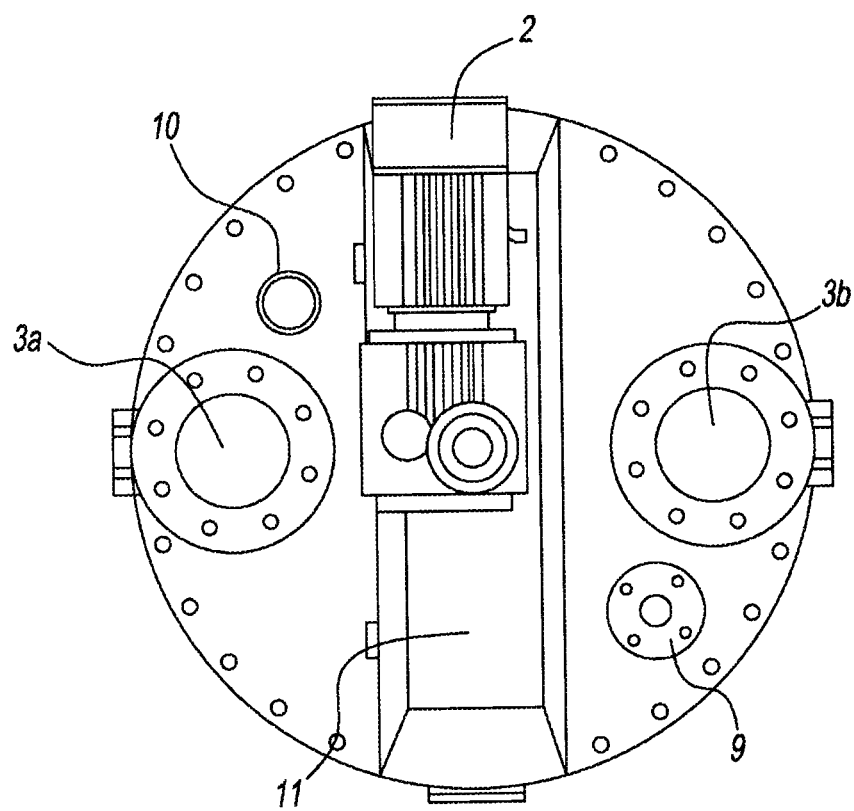
FIG. 4 is a top-down view of the device of the present invention, in particular depicting the feeding ports, gas outlet and explosion vent of the present invention.
Figure 5A:
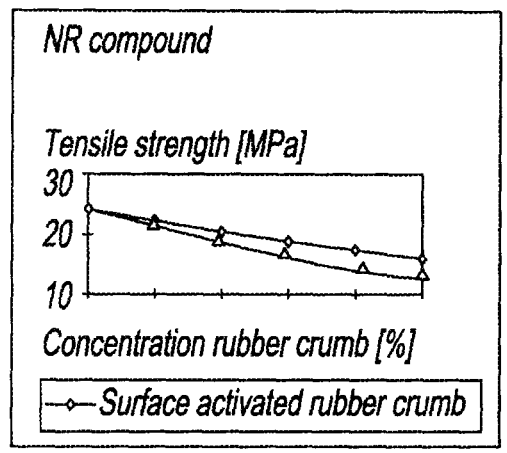
FIGS. 5A and 5B show the influence on compound properties by surface activated rubber crumb as opposed to untreated rubber crumb.
Figure 5B:
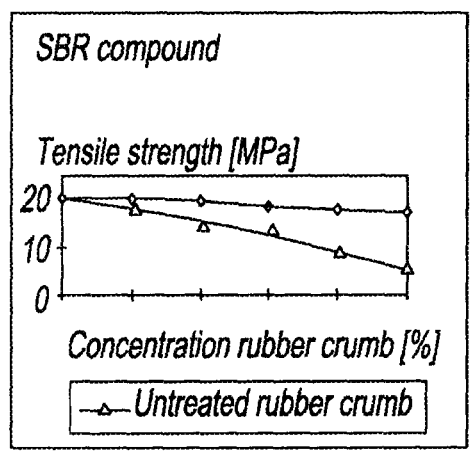
Figure 6:
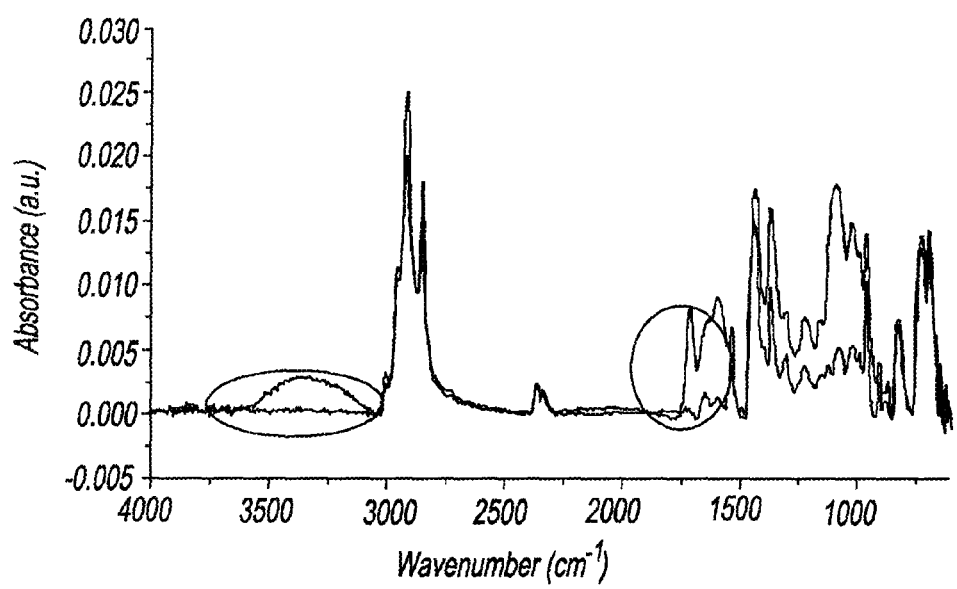
FIG. 6 shows the functional groups in Fourier transform infrared spectroscopy (FTIR) analysis graph from preliminary studies, where the black and grey lines, respectively, represent the presence of molecular functional groups before and after the gaseous surface activation process.

FIG. 4 illustrates where the aggressive gas is preferably emptied out of the vessel 1 through gas outlet 9. Also depicted is where the fragmentation and activation reactions in vessel 1 can be monitored through an inspection port 10 with sight glass. An explosion vent 11 constructed for Maximum Explosion Pressure Pmax=12.8 bar and Maximum Rate of Pressure Rise Kst=149 m·bar/s is also illustrated.

Thus, the described fragmentation and activation reactions in vessel 1 simultaneously produce a powder-like particulate polymeric form with the requisite relatively large surface area of the polymeric materials produced also having a resultant activated surface area.

Claims defining the invention are as follows:
1. A method of polymeric material fragmentation and activation by utilizing aggressive gasses for both modifying the polymeric materials surface area into an activated state and also simultaneously reducing the polymeric materials particle size whilst increasing its relative surface area, the method comprising;
   placing already preliminarily deformed polymeric materials into a vessel for gas-solid reactions under mechanical agitation,
   feeding aggressive gasses into the vessel for enabling gas-solid reactions under mechanical agitation, agitating the preliminarily deformed polymeric materials and aggressive gasses by mechanical means for driving the preliminarily deformed polymer material from up to down and around to also lift the said polymer material from bottom to top for optimal processing, agitating the preliminarily deformed polymeric materials and aggressive gasses by mechanical means for circulating the aggressive gas near the surface of the preliminarily deformed polymeric materials, thus limiting the diffusion of the aggressive gas to the surface of the fed preliminarily deformed polymeric materials and thereby increasing convection and providing a faster kinetic disintegration of the preliminarily deformed polymeric materials by the aggressive gas breaking their chemical bonds, thus rupturing the polymer carbon chains and reducing the preliminarily deformed polymer materials to fragments, agitating the preliminarily deformed polymeric materials and aggressive gasses by mechanical means for promoting further fragmentation of the fed preliminarily deformed polymeric materials as the applied aggressive gasses enter the cracks in the already preliminarily deformed polymeric materials and propagate the said cracks, and as propagation of these cracks increases, opening new surfaces for further degradation to occur, and agitating the preliminarily deformed polymeric materials and aggressive gasses by mechanical means for a specified length of time with a specified concentration and flow rate of the aggressive gasses, thereby modifying the surface area of the preliminarily deformed polymeric materials via gas-solid reactions to cause the surface area to turn into an activated state with an increase in the requisite Aldehyde, Carboxylic acid, Hydrogen peroxide, Hydroxyl, and Ketone molecular functional groups on the surface area, the composition of the aggressive gasses used being represented by the following ratio formula 1:

$$A\%:B\%:C\%, \text{ where } A<B<C \text{ and } A\leq10\% \text{ of the total \% by weight, wherein } A=\text{Ozone};\quad\text{[Formula 1]}$$

B=Nitrogen; and
C=Oxygen,
to simultaneously fragment the fed preliminarily deformed polymeric materials into a powder-like particulate polymeric form with a relatively increased surface area, as well as activate the preliminarily deformed polymeric materials surface area.

2. A method according to claim 1, wherein the aggressive gasses are fed with or without a catalyst for the gas-solid reactions.

3. A method according to claim 1, wherein feeding aggressive gasses includes controlling the volume of aggressive gas in the reaction chamber by respective application of a partial or full vacuum or admission of air.

4. A method according to claim 1, wherein the simultaneous polymeric material fragmentation and activation occurs at standard atmospheric pressure and room temperature of 20 degrees Celsius.

5. A method according to claim 1, wherein the ozone gas component utilization is a maximum of 4 grams of ozone per 1 kilogram of said preliminarily deformed polymeric material by weight.

6. A method according to claim 1, wherein the ozone gas component flow rate is a minimal of 1 liter per minute of ozone for every 10 liters of vessel volume.

7. A method according to claim 1, wherein the size of the preliminarily deformed polymeric materials being placed into the vessel are of size 5 millimeters or smaller.

8. A method according to claim 1, wherein the preliminarily deformed polymeric materials do not contain metal reinforcing elements.

9. A method according to claim 1, wherein the preliminarily deformed polymeric materials are processed in separate batches according to the hardness of the said preliminarily deformed polymeric materials.

10. A method according to claim 1, wherein the preliminarily deformed polymeric materials that have previously been treated for ozone resistance are firstly removed into a separate batch prior to the then also separate batch processing of the previously treated polymeric materials according to their hardness.

11. A method according to claim 1, wherein the aggressive gas ozone can be readily converted to oxygen by application of heat or chemical reaction with or without a catalyst.

12. A method according to claim 1, wherein the fragmentation and activation is carried out via a battery of said devices being operatively connected in their use of the applied aggressive gasses is carried out via a battery of reaction chambers being operatively connected in their use of the applied aggressive.

13. A device comprising;
a vessel for enabling simultaneous mechanical agitation performed in conjunction with gas-solid reactions inside the vessel, the vessel defining a conical inside surface that tapers at a constant angle from a narrow diameter at a bottom end to a wider diameter at a top end, a means for feeding the required aggressive gasses into the vessel, a means for feeding preliminarily deformed polymeric materials into the vessel prior to, during, and/or after the aggressive gas is applied into the vessel, mechanical agitation means situated within the vessel to drive the preliminarily deformed polymeric materials from up to down and around the vessel, to also lift the said polymeric materials from the bottom to the top of the vessel, and at the same time to also circulate the fed aggressive gasses near the surface of the polymeric materials inside the vessel, the mechanical agitation means including a first single piece spiral mixer that extends coaxially with the vessel from the bottom end of the vessel towards the top end and which increases in diameter from the bottom end of the vessel towards the top end and which has an outer diameter that is closely adjacent to the inside surface of the vessel, the mechanical agitation means further including a second spiral mixer that extends coaxially with the vessel from the bottom end of the vessel towards the top end and which is of constant diameter, motorized means of controlling the frequency and speed of the said mechanical agitation, and a means of emptying the resultant fragmented and activated particulate material either during or after the mechanical agitation.

14. A device according to claim 13, wherein contact areas of the vessel for polymeric materials and aggressive gasses and its mechanical agitation means are constructed of SS316L stainless steel.

15. A device according to claim 13, wherein the motorized means of controlling the frequency and speed of the mechanical agitation operates at a speed range of 10 to 50 RPM.

16. A device according to claim 13, wherein the means of emptying the resultant fragmented and activated particulate material utilizes a pneumatic ball valve operating either during or after the mechanical agitation.

17. A device according to claim 13, wherein the vessel incorporates an explosion vent to suit Maximum Explosion Pressure Pmax=12.8 bar and Maximum Rate of Pressure Rise Kst=149 m·bar/s.

18. A device according to claim 13, wherein the vessel incorporates electric protection class for the drive assembly of the vessel.

19. A device according to claim 13, wherein the fragmentation and activation is carried out via a battery of said devices being operatively connected in their use of the applied aggressive gasses.

* * * * *